United States Patent
Yamamoto et al.

(10) Patent No.: US 9,490,497 B2
(45) Date of Patent: Nov. 8, 2016

(54) SOLID POLYMER ELECTROLYTE TYPE FUEL CELL, AND ELECTROLYTE MEMBRANE-ELECTRODE-FRAME ASSEMBLY

(71) Applicant: Panasonic Corporation, Osaka (JP)

(72) Inventors: Yoko Yamamoto, Osaka (JP); Mitsuo Yoshimura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/374,528

(22) PCT Filed: Apr. 9, 2013

(86) PCT No.: PCT/JP2013/002418
§ 371 (c)(1),
(2) Date: Jul. 25, 2014

(87) PCT Pub. No.: WO2013/161200
PCT Pub. Date: Oct. 31, 2013

(65) Prior Publication Data
US 2014/0377679 A1  Dec. 25, 2014

(30) Foreign Application Priority Data
Apr. 27, 2012 (JP) .................................. 2012-102219

(51) Int. Cl.
*H01M 8/24* (2016.01)
*H01M 8/00* (2016.01)
(Continued)

(52) U.S. Cl.
CPC ............ *H01M 8/242* (2013.01); *H01M 8/006* (2013.01); *H01M 8/0273* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

2003/0104262 A1  6/2003 Kuroki et al.
2005/0136317 A1  6/2005 Ferguson
(Continued)

FOREIGN PATENT DOCUMENTS

| JP | 2005-235736 | 9/2005 |
|---|---|---|
| JP | 2008-177001 | 7/2008 |

(Continued)

OTHER PUBLICATIONS

International Search Report of PCT Application No. PCT/JP2013/002418 dated Jul. 24, 2013.

*Primary Examiner* — Miriam Stagg
*Assistant Examiner* — Haroon S Sheikh
(74) *Attorney, Agent, or Firm* — Panasonic IP Management; Kerry S. Culpepper

(57) ABSTRACT

Provided is a solid polymer electrolyte type fuel cell having high durability. The fuel cell comprises a stack of single cell modules, each including an electrolyte membrane-electrode-frame assembly and a pair of separators. The electrolyte membrane-electrode-frame assembly includes a catalyst layer-attached electrolyte membrane having a polymer electrolyte membrane, an anode catalyst, and a cathode catalyst, a frame that is disposed at a peripheral portion of the catalyst layer-attached electrolyte membrane and has a rectangular inner periphery, and a pair of gas diffusion layers that are disposed on both surfaces of the catalyst layer-attached electrolyte membrane. The gas diffusion layers were disposed to cover an inner peripheral portion of the frame, respectively. A thickness of at least a part of a corner portion of the inner peripheral portion is smaller than a thickness of a linear side portion of the inner peripheral portion of the frame.

7 Claims, 12 Drawing Sheets

(51) Int. Cl.
*H01M 8/02* (2016.01)
*H01M 8/10* (2016.01)

(56) References Cited

U.S. PATENT DOCUMENTS

2005/0181263 A1 8/2005 Tsugane
2010/0104913 A1* 4/2010 Yamauchi et al. .............. 429/30
2010/0291462 A1 11/2010 Thate et al.
2011/0177423 A1* 7/2011 Nachtmann et al. ......... 429/480

FOREIGN PATENT DOCUMENTS

| JP | 2009-505364 | 2/2009 | | |
|----|----|----|----|----|
| JP | 2010-067602 | 3/2010 | | |
| WO | 02/01658 | 1/2002 | | |
| WO | 02/065572 | 8/2002 | | |
| WO | WO 02065572 A2 * | 8/2002 | .......... | H01M 8/0202 |
| WO | 2008/126350 | 10/2008 | | |

* cited by examiner

SOLID POLYMER ELECTROLYTE TYPE FUEL CELL, AND ELECTROLYTE MEMBRANE-ELECTRODE-FRAME ASSEMBLY

CROSS-REFERENCE TO RELATED APPLICATIONS

The present application is a U.S. national stage application of PCT International Application No. PCT/JP2013/002418 filed on Apr. 9, 2013, and claims the benefit of foreign priority of Japanese Patent Application No. 2012-102219 filed on Apr. 27, 2012, the contents all of which are incorporated herein by reference.

TECHNICAL FIELD

The present invention relates to a solid polymer electrolyte type fuel cell, and an electrolyte membrane-electrode-frame assembly of the fuel cell.

BACKGROUND ART

The solid polymer electrolyte type fuel cell includes a polymer electrolyte membrane that is capable of selectively transporting hydrogen ions, and a pair of electrodes (including an anode and a cathode) that are formed on both surfaces of the electrolyte membrane. Each of the electrodes includes a catalyst layer formed on a surface of the electrolyte membrane, and a gas diffusion layer (GDL) that is disposed on an outer side of the catalyst layer and has both gas permeability and electron conductivity. In this manner, a member obtained by integrally joining and assembling the electrolyte membrane and the electrodes is referred to as an electrolyte membrane-electrode assembly (MEA).

The MEA is interposed and mechanically fixed between a pair of conductive separators, and adjacent MEAs are electrically connected to each other in series. A gas flow channel is formed at a portion, which comes into contact with the MEA, of each of the separators. A reaction gas is supplied to each of the electrodes through the gas flow channel to remove generated water or a redundant gas from the electrode. In this manner, a structure body in which the MEA is interposed between the pair of separators is referred to as a single cell module (cell).

A penetration hole, which is called a manifold hole, is formed at an edge portion of each of the separators so as to supply the reaction gas to the gas flow channel of the separator. The reaction gas that flows through the penetration hole is distributed to the gas flow channels of a plurality of the separators.

Furthermore, a sealing member is disposed between the pair of separators to surround the outer periphery of an electrode forming portion (that is, a power generation region) of the MEA so as to prevent the reaction gas supplied to the gas flow channels or the like from being leaked to the outside or being mixed.

As an electrolyte membrane-electrode assembly in the related art, an assembly in which a frame, a reinforcing sheet, a gasket, and the like are formed in the outer periphery of the MEA is known (For example, refer to PTL 1 to PTL 8). For example, FIG. 11 illustrates a manufacturing process of MEA 101 disclosed in PTL 1. In FIG. 11, MEA 101 and reinforcing frame 102 are disposed separately from each other in mold 105, and rubber 103 is filled in a separation portion. Rubber 103 is impregnated in gas diffusion layer (GDL) 104 that constitutes MEA 101, whereby MEA 101 and reinforcing frame 102 are integrated each other.

In addition, FIG. 12 shows a diagram illustrating electrolyte membrane catalyst laminated body 201 of the related art disclosed in PTL 2. In FIG. 12, electrolyte membrane catalyst laminated body 201 includes electrolyte membrane 203 in which catalyst layer 202 is disposed on both surfaces thereof, and reinforcing sheet 204 including adhesive layer 205 and elastic layer 206, the adhesive layer 205 being bonded to an outer circumferential surface of electrolyte membrane 203.

Furthermore, a method of suppressing damage of the gas diffusion layer and the electrolyte membrane in the solid polymer electrolyte type fuel cell is suggested (refer to PTL 9 and PTL 10).

CITATION LIST

Patent Literature

[PTL 1]
Japanese Patent Application Laid-Open No. 2008-177001
[PTL 2]
Japanese Patent Application Laid-Open No. 2010-067602
[PTL 3]
International Publication No. 2008/126350
[PTL 4]
US Patent Application Laid-Open No. 2010/0104913
[PTL 5]
Japanese Translation of a PCT Application Laid-Open No. 2009-505364
[PTL 6]
US Patent Application Laid-Open No. 2010/0291462
[PTL 7]
International Publication No. 02/001658
[PTL 8]
US Patent Application Laid-Open No. 2003/0104262
[PTL 9]
Japanese Patent Application Laid-Open No. 2005-235736
[PTL 10]
US Patent Application Laid-Open No. 2005/0181263

SUMMARY OF INVENTION

Technical Problem

It is required for the MEA of the solid polymer electrolyte type fuel cell to have high durability. However, for example, in the manufacturing of the MEA (FIG. 11) of PTL 1, a pressure is applied to the electrolyte membrane or the gas diffusion layer for filling rubber 103, and in the result there is a possibility that the electrolyte membrane or the gas diffusion layer may be mechanically fractured.

In addition, in electrode membrane-catalyst layer laminated body 201 (FIG. 12) of PTL 2, a gap is present between the catalyst layer laminated on both surfaces of the electrolyte membrane and the reinforcing sheet, and in result the electrolyte membrane or the catalyst layer is directly exposed to a gas fluid. Therefore, deterioration of the electrolyte membrane is accelerated, and there is a problem with durability.

The invention has been made to solve the problems in the related art, and an object thereof is to provide a solid polymer electrolyte type fuel cell having an MEA with high durability.

Solution to Problem

According to an aspect of the invention, there is provided a solid polymer electrolyte type fuel cell comprising stacked single cell modules, each including an electrolyte membrane-electrode-frame assembly, a pair of separators that interpose the electrolyte membrane-electrode-frame assembly therebetween from the anode side and the cathode side, and a pair of gas diffusion layers. The electrolyte membrane-electrode-frame assembly includes: a catalyst layer-attached electrolyte membrane having a polymer electrolyte membrane, an anode catalyst provided on one surface of the polymer electrolyte membrane, and a cathode catalyst provided on the other surface of the polymer electrolyte membrane; and a frame that is disposed at a peripheral portion of the catalyst layer-attached electrolyte membrane, includes a gas supply portion configured to supply a fuel gas and an oxidant gas to the anode catalyst and the cathode catalyst, respectively, and has a rectangular inner periphery. The pair of gas diffusion layers is disposed between the pair of separators and the electrolyte membrane-electrode-frame assembly and are laminated to cover an inner peripheral portion of the frame. A thickness of at least a part of a corner portion of the inner peripheral portion of the frame is smaller than a thickness of a linear side portion of the inner peripheral portion of the frame.

In addition, according to another aspect of the invention, there is provided an electrolyte membrane-electrode-frame assembly including: a catalyst layer-attached electrolyte membrane including a polymer electrolyte membrane, an anode catalyst provided on one surface of the polymer electrolyte membrane, and a cathode catalyst provided on the other surface of the polymer electrolyte membrane; and a frame that is disposed at a peripheral portion of the catalyst layer-attached electrolyte membrane, includes a gas supply portion configured to supply a fuel gas and an oxidant gas to the anode catalyst and the cathode catalyst, respectively, and has a rectangular inner periphery. A thickness of at least a part of a corner portion of the inner peripheral portion of the frame is smaller than a thickness of a linear side portion of the inner peripheral portion of the frame.

Advantageous Effects of Invention

According to the above-described configurations, a gap is not likely to occur between the frame and the gas diffusion layer. Accordingly, it is possible to provide a solid polymer electrolyte type fuel cell having an MEA with high durability while the electrolyte membrane or the catalyst layer is not directly exposed to a gas. In addition, in the polymer electrolyte type fuel cell comprising stacked single cell modules, an overload, which occurs when the gas diffusion layers are twisted and overlap each other, does not occur. Accordingly, damage to the electrolyte membrane or the gas diffusion layers, which occurs due to the overload, is reduced.

As a result, it is possible to provide a high-durability MEA in which the damage to the electrolyte membrane and the gas diffusion layer is small.

DESCRIPTION OF EMBODIMENTS

Hereinafter, embodiments of the invention will be described with reference to the attached drawings.

Embodiment 1

A fuel cell is, for example, a solid polymer electrolyte type fuel cell (PEFC), and generates electric power, heat, and water at the same time by allowing a hydrogen-containing fuel gas and an oxygen-containing oxidant gas such as air to electrochemically react with each other.

Figure 1:
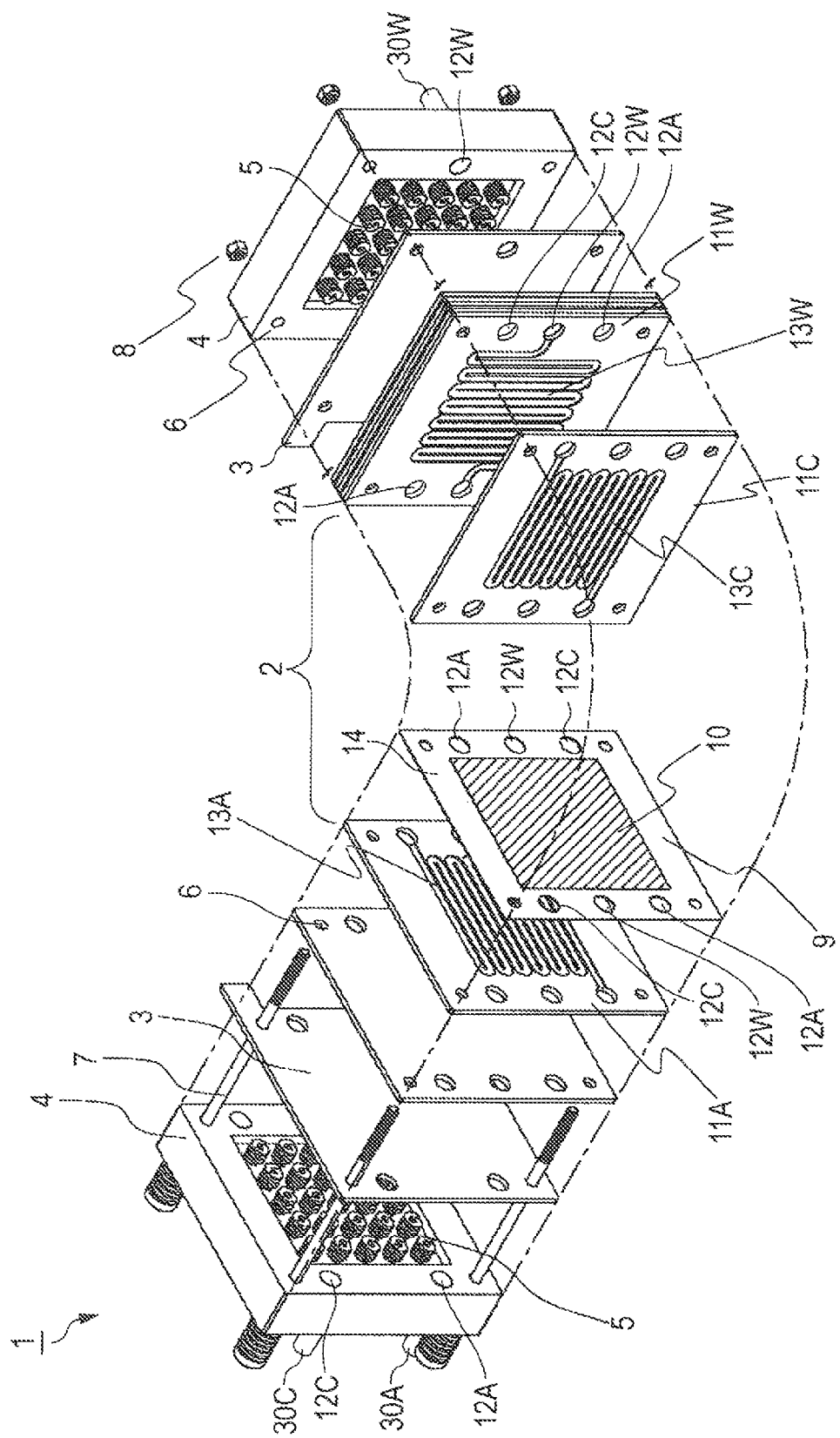
FIG. 1 is an exploded perspective diagram of a fuel cell stack.

FIG. 1 shows an exploded perspective diagram schematically illustrating a partial structure of fuel cell stack 1, that is, an example of the polymer electrolyte type fuel cell (PEFC).

As shown in FIG. 1, fuel cell stack 1 includes a plurality of single cell modules (cell) 2, and these modules are stacked in series. Fuel cell stack 1 includes a plurality of single cell modules (cells) 2, and a pair of current collector plates 3 and a pair of end plates 4 that are disposed at both ends. Fastening of fuel cell stack 1 is carried out using four fastening bolts 7 that penetrate through volt holes 6, respectively, and four nuts 8.

Current collector plates 3 are disposed on both sides of a stack of single cell modules 2. Each current collector plate 3 is a member that efficiently collects electricity generated by the single cell modules. Current collector plate 3 is a copper plate that is plated with, for example, gold. In addition, current collector plate 3 may be a metallic plate with satisfactory electric conductivity, for example, a metallic plate of iron, stainless steel, aluminum, or the like. In addition, current collector plate 3 may be subjected to a surface treatment such as tin plating and nickel plating.

Each end plate 4 using an electrically insulating material is disposed at an outer side of current collector plate 3. End plate 4 also functions as an insulating plate. For example, the end plate 4 is manufactured by injection-molding a polyphenylene sulfide resin.

Spring 5 is disposed at an inner side of end plate 4. Spring 5 applies a load to the stack of single cell modules 2. Spring 5 is disposed at the central region of end plate 4 so as to easily apply the load to a power generation region of MEA 10. The load due to spring 5 is adjusted by a fastening pressure of fastening volts 7 and nuts 8 during assembling of fuel cell stack 1.

End plate 4 is integrally molded with a pair of pipes 30A, pipes 30C, and pipes 30W. Pipes 30A, pipes 30C, and pipes 30W communicate with manifold holes 12 (12A, 12C, and 12W) of single cell modules 2, respectively.

Each single cell module 2 includes electrolyte membrane-electrode-frame assembly 14 having frame 9 at a peripheral portion of MEA 10, a pair of conductive separators (including anode side separator 11A and cathode side separator 11C) that interposes electrolyte membrane-electrode-frame assembly 14 therebetween, and cooling water separator 11W.

Bolt holes 6 and manifold holes 12 (12A, 12C, and 12W) are formed in frame 9 and separators 11 (11A, 11C, and 11W), respectively, frame 9 being disposed at the peripheral portion of MEA 10 constituting electrolyte membrane-electrode-frame assembly 14. Manifold holes 12 include a pair of penetration holes 12A through which a fuel gas flows, a pair of penetration holes 12C through which an oxidant gas flows, and a pair of penetration holes 12W through which cooling water flows. In the stack of single cell modules 2, bolt holes 6 communicate with each other, and the manifold holes communicate with each other.

Anode side separator 11A and cathode side separator 11C have a flat plate shape, and a surface (inner surface) thereof on a side that comes into contact with MEA 10 is shaped in conformity with a shape of MEA 10. Furthermore, fuel gas flow channel groove 13A is formed on the inner surface of the anode side separator 11A, and also an oxidant gas flow channel groove 13C is formed on the inner surface of the cathode side separator 11C. And further, cooling water flow channel groove 13W is formed on the surface of separator 11W.

Each of separators 11 is formed from a gas non-permeable conductive material, and for example, a member obtained by cutting a resin-impregnated carbon material into a predetermined shape, a member that is obtained by molding a mixture of carbon powders and a resin material, or a member that is obtained by shaping a metal are generally used.

When the plurality of single cell modules 2 are stacked, manifold holes 12A communicate with each other to form a fuel gas manifold, manifold holes 12C communicate with each other to form an oxidant gas manifold, and manifold holes 12W communicate with each other to form a cooling water manifold.

Although not shown in FIG. 1, a gasket is disposed between separators 11 (11A and 11C) and frame 9. The gasket is constituted by an elastic body. It is preferable that the gasket is formed integrally with each of separators 11. The gasket is pressed in fuel cell stack 1 so as to deform in correspondence with a shape of frame 9 of MEA 10, and as a result the gasket seals an outer periphery of MEA 10 or an outer periphery of manifold holes 12. According to this sealing, the fuel gas, the oxidant gas and the cooling water are prevented from being leaked from a gap between adjacent single cell modules 2, or a connection portion of respective manifold holes 12.

FIGS. 2A to 4 show a configuration of electrolyte membrane-electrode-frame assembly 14 (refer to FIG. 1).

Figure 2A:
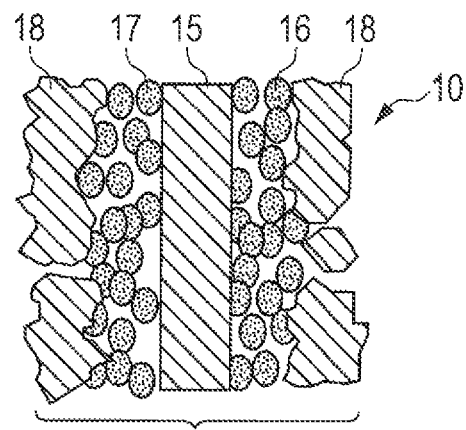
FIG. 2 is a configuration diagram of an electrolyte membrane-electrode-frame assembly according to Embodiment 1.
Figure 2B:
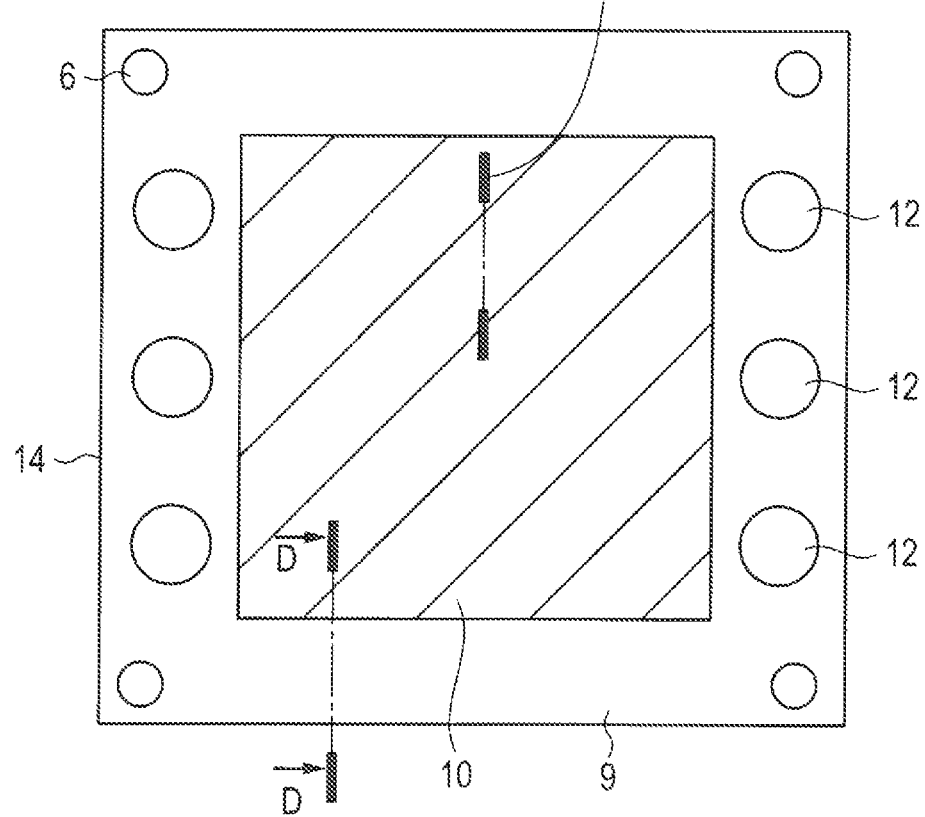

FIG. 2B shows a top view of electrolyte membrane-electrode-frame assembly 14. FIG. 2A shows a partial cross-sectional diagram of MEA 10 of electrolyte membrane-electrode-frame assembly 14.

As shown in the partial cross-sectional diagram of FIG. 2A, MEA 10 includes polymer electrolyte membrane 15 that selectively transports hydrogen ions, catalyst layer (anode catalyst layer) 16 that is disposed on an anode surface side of polymer electrolyte membrane 15, and catalyst layer (cathode catalyst layer) 17 that is disposed on a cathode surface side of polymer electrolyte membrane 15.

As electrolyte membrane 15, a solid polymer material that exhibits proton conductivity, for example, perfluorosulfonic acid membrane (Nafion membrane manufactured by Du Pont Kabushiki Kaisha) can be generally used. Catalyst layer (anode catalyst) 16 may be a catalyst layer containing carbon powders on which a platinum-ruthenium alloy catalyst is supported, as a main component. Catalyst layer (cathode catalyst) 17 may be a catalyst layer containing carbon powders on which a platinum catalyst is supported, as a main component.

Furthermore, gas diffusion layer (GDL) 18 is laminated in MEA 10, gas diffusion layer (GDL) 18 being disposed at outer sides of catalyst layer (anode catalyst) 16 and catalyst layer (cathode catalyst) 17, and having both fuel gas or oxidant gas permeability and electron conductivity. Gas diffusion layer (GDL) 18 may be or may not be integrated with electrolyte membrane 15, catalyst layer (anode catalyst) 16, and catalyst layer (cathode catalyst) 17.

Figure 3:
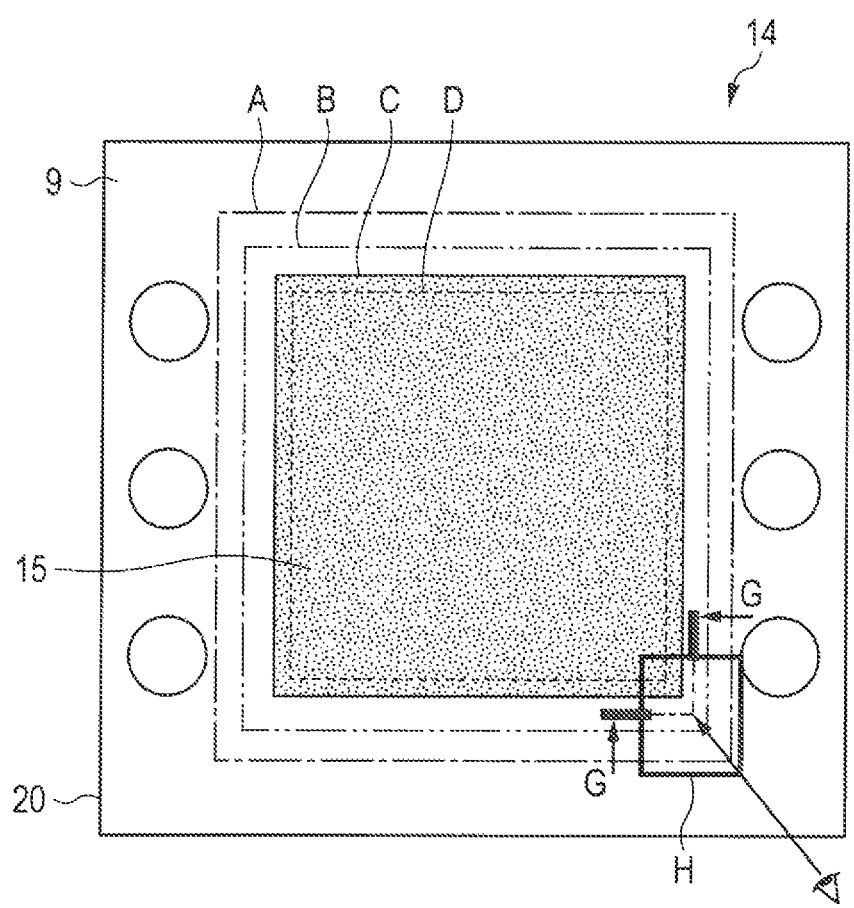
FIG. 3 is a schematic diagram of the electrolyte membrane-electrode-frame assembly according to Embodiment 1.

FIG. 3 shows a top view of electrolyte membrane-electrode-frame assembly 14. A region surrounded by "line A" is a region in which electrolyte membrane 15 and catalyst layers 16 and 17 are disposed. A region surrounded by "line B" is a region in which gas diffusion layer (GDL) 18 is disposed. "Line C" represents an inner peripheral side of frame 9. A region surrounded by "line D" is a power generation region.

Figure 4A:
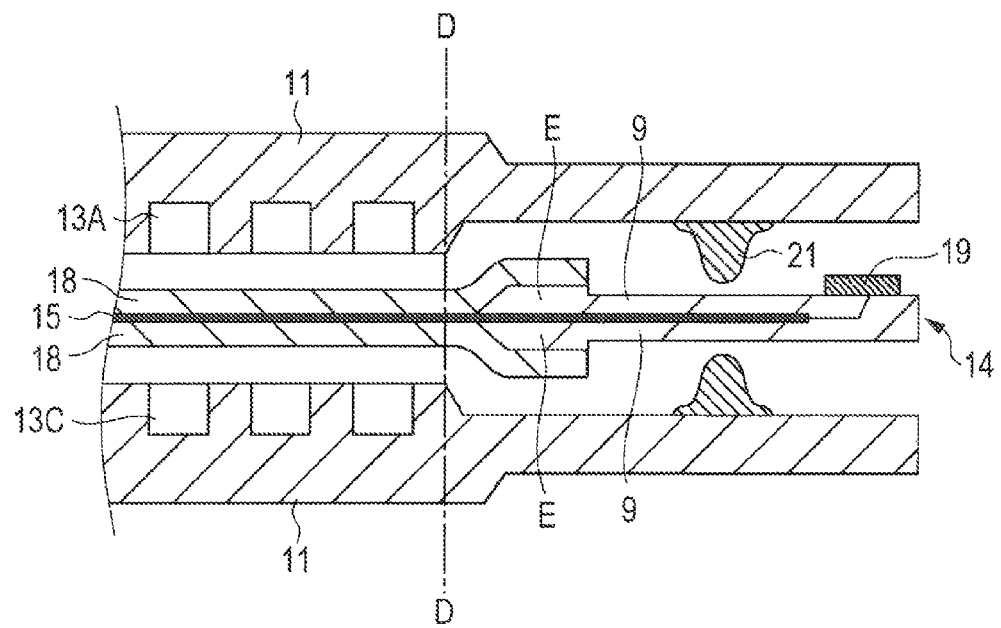
FIG. 4A shows an exploded state of a single cell module according to Embodiment 1, and is a partial cross-sectional diagram of the electrolyte membrane-electrode-frame assembly and a pair of separators.
Figure 4B:
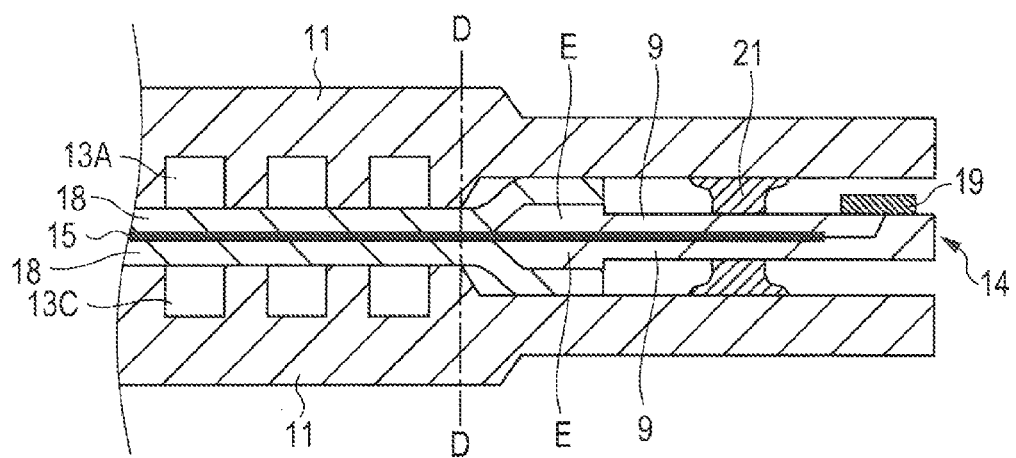
FIG. 4B illustrates a laminated state of a single cell module according to Embodiment 1, and is a partial cross-sectional diagram of the electrolyte membrane-electrode-frame assembly and the pair of separators.

FIGS. 4A and 4B show partial cross-sectional diagrams of single cell module 2 (refer to FIG. 1), which includes a cross-section taken along a line D-D of electrolyte membrane-electrode-frame assembly 14 in FIG. 2B. FIG. 4A shows a partial cross-sectional diagram illustrating an exploded state of single cell module 2. FIG. 4B shows a partial cross-sectional diagram illustrating a state of single cell module 2 assembled into fuel cell stack 1.

As shown in FIGS. 4A and 4B, electrolyte membrane-electrode-frame assembly 14 includes electrolyte membrane 15 in which catalyst layers 16 and 17 are laminated on both surfaces thereof, and a picture-frame-shaped frame 9 into which a peripheral portion of electrolyte membrane 15 is inserted. In addition, in FIGS. 4A and 4B, catalyst layers 16 and 17 are omitted.

Frame 9 may be a resin molded product. In addition, frame 9 may be obtained by bonding two frame precursors with the peripheral portion of electrolyte membrane 15 interposed therebetween. The bonding of the two frame precursors is performed by disposing a bonding portion 19 on a bonding surface. The bonding portion 19 may be a resin molded product, or may be constituted by an adhesive or the like. When the two frame precursors are bonded, electrolyte membrane 15 on which catalyst layers 16 and 17 are laminated and frame 9 are integrated with each other, whereby a catalyst layer-attached electrolyte membrane-frame assembly is obtained.

A pair of gas diffusion layers (GDLs) 18 is disposed on both surfaces of the catalyst layer-attached electrolyte membrane-frame assembly, respectively. Each gas diffusion layers (GDLs) 18 is laminated on frame 9 so as to overlap the inner peripheral portion of frame 9. In this way, electrolyte membrane 15 is inserted in frame 9, and then gas diffusion layers (GDLs) 18 are joined.

With this configuration, when disposing bonding portion 19, it is not necessary to apply an excessive pressure (for example, a molding pressure) to electrolyte membrane 15. Furthermore, since the pressure for disposing (laminating) the pair of gas diffusion layers (GDLs) 18 is weak, an excessive pressure is not applied to electrolyte membrane 15. As a result, electrolyte membrane-electrode-frame assembly 14 may be manufactured without applying an excessive pressure to electrolyte membrane 15, and thus durability of MEA 10 of electrolyte membrane-electrode-frame assembly 14 may be increased.

As shown in FIG. 4A, in electrolyte membrane-electrode-frame assembly 14, a thickness of a part (convex portion E) of the inner peripheral portion of frame 9, into which electrolyte membrane 15 is inserted, is set to be larger than a thickness of the outer peripheral portion thereof. Gas diffusion layers (GDLs) 18 ride on convex portion E with a large thickness. In addition, as shown in FIG. 4B, in single cell module 2 assembled into fuel cell stack 1, gas diffusion layers (GDLs) 18 placed on the inner peripheral portion of frame 9 are configured to fill a space (gap) between separator 11 and frame 9.

When gas diffusion layers (GDLs) 18 are disposed to ride on the inner peripheral portion of frame 9 as described above, electrode membrane 15 to which the catalyst layers are bonded may be prevented from being exposed. Electrolyte membrane 15, which is exposed, may come into direct contact with a gas, and thus may deteriorate. Electrolyte membrane 15 of the MEA according to Embodiment 1 is prevented from deteriorating, and thus durability thereof is improved.

Furthermore, when gas diffusion layers (GDLs) 18 are disposed to ride on the inner peripheral portion of frame 9, a gap between separator 11 and frame 9 on an outer side in relation to the power generation region (in FIG. 3, the region surrounded by the line D) is filled with gas diffusion layer (GDL) 18 that is composed of elastic body. Accordingly, a gas is prevented from being leaked to the outside of the power generation region, and a cross leakage is suppressed in which the gas goes around from an anode electrode to a cathode electrode through an end surface of electrolyte membrane 15.

Figure 5:
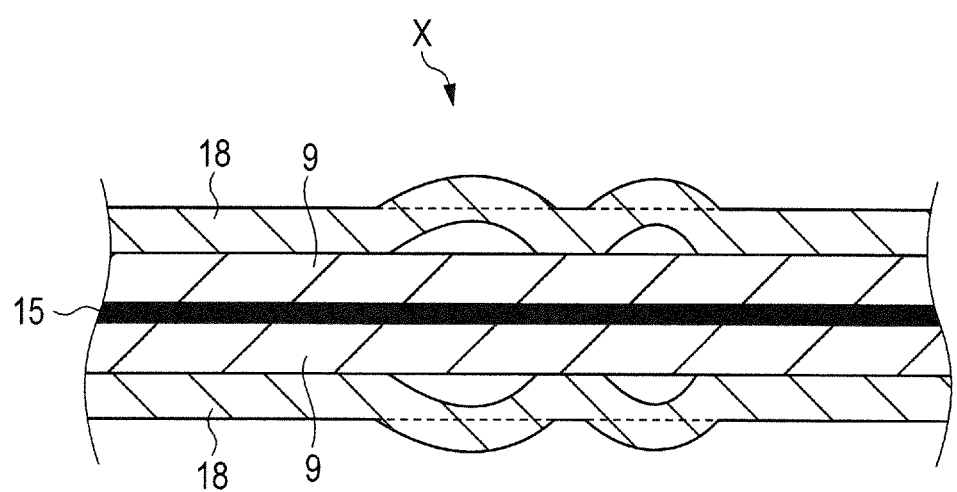
FIG. 5 is a cross-sectional diagram of a corner portion of the electrolyte membrane-electrode-frame assembly in a case of assuming that an inner peripheral portion of the frame has the same height over the entire periphery.

FIG. 5 shows a cross-section, which is taken along a line G-G of electrolyte membrane-electrode-frame assembly 14 shown in FIG. 3, in a case of assuming that the inner peripheral portion of frame 9 has the same height over the entire periphery. The case in which the inner peripheral portion of frame 9 has the same height over the entire periphery can mean that convex portion E is formed along the inner peripheral portion of frame 9 over the entire periphery.

In the case where the inner peripheral portion of frame 9 has the same height over the entire periphery, gas diffusion layers (GDLs) 18, which ride on the inner peripheral portion of frame 9, are twisted or overlap each other at corner portion X of the inner peripheral portion of frame 9. Therefore, the thickness of single cell module 2 at the corner portion X increases (refer to FIG. 5). As a result, a load that is necessary to fasten fuel cell stack 1 becomes excessive, or an excessive load is applied to the region (corner portion) at which gas diffusion layers (GDLs) 18 overlap each other or are twisted. Due to this, there is a concern that electrolyte membrane 15 and gas diffusion layer (GDL) 18 may be fractured.

Figure 6:
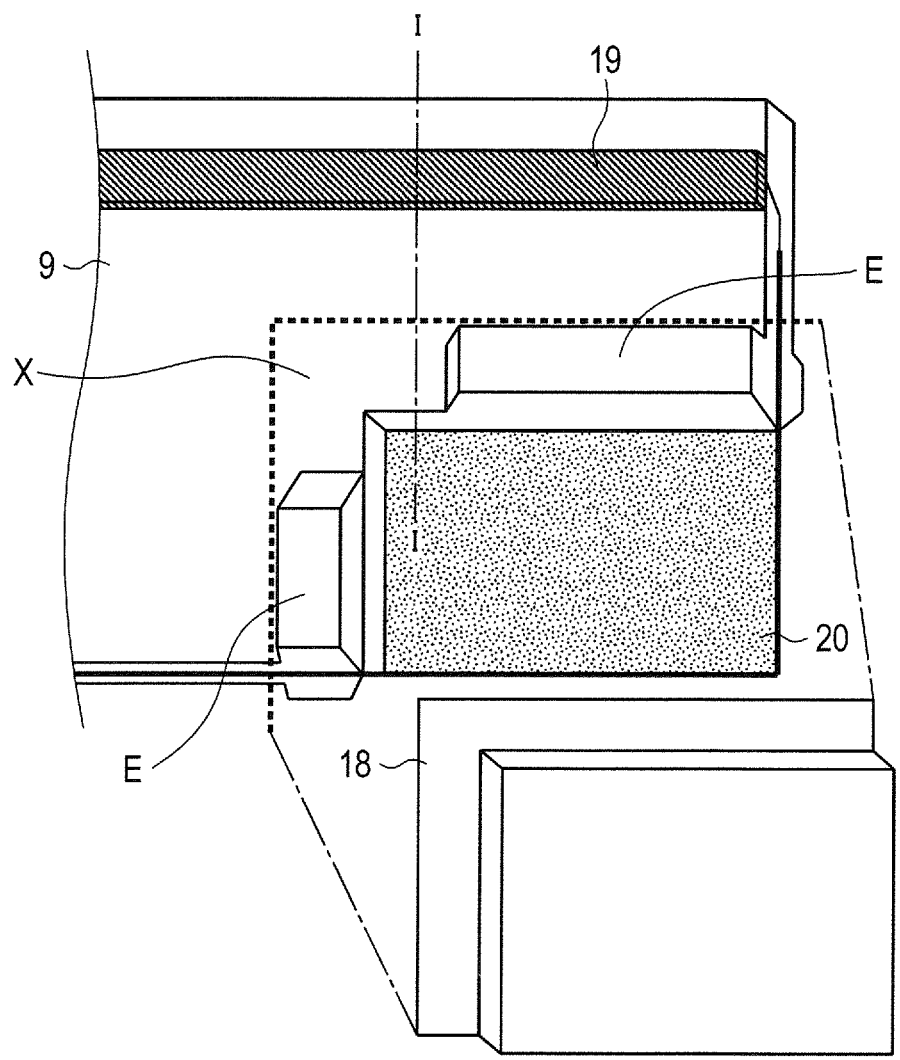
FIG. 6 illustrates an exploded state of the electrolyte membrane-electrode-frame assembly according to Embodiment 1, and is a schematic diagram partially illustrating a corner portion of the inner peripheral portion of the frame and a gas diffusion layer (GDL).

FIG. 6 shows an exploded diagram of electrolyte membrane-electrode-frame assembly 14 of Embodiment 1. FIG. 6 illustrates configurations of corner portion X of the inner peripheral portion of frame 9 and a part of gas diffusion layers (GDLs) 18. Due to the configuration illustrated in FIG. 6, even when the overlapping and twisting of gas diffusion layers (GDLs) 18 occur at corner portion X shown in FIG. 5, an excessive load is not likely to be applied to the corner portion X. That is, electrolyte membrane 15 and gas diffusion layers (GDLs) 18 are not likely to be fractured. Hereinafter, a reason thereof will be described.

FIG. 6 shows a schematic diagram in which a range of electrolyte membrane-electrode-frame assembly 14 surrounded by a line H in FIG. 3 is exploded and enlarged. A portion of frame 9, the portion being along a linear side of the inner peripheral portion of frame 9, protrudes in a front direction that is orthogonal to a paper plane, so as to constitute convex portion E. On the other hand, the height of corner portion X of the inner peripheral portion of frame 9 is set to be the same as the height of the outer peripheral portion of frame 9. That is, the height of corner portion X of the inner peripheral portion of frame 9 is configured to be lower than the height of convex portion E along the linear side portion of the inner peripheral portion of frame 9.

A dotted line of FIG. 6 indicates a region in which gas diffusion layers (GDLs) 18 are disposed. Gas diffusion layers (GDLs) 18 are disposed to ride on convex portion E along the linear side portion of the inner peripheral portion of frame 9.

Figure 7:
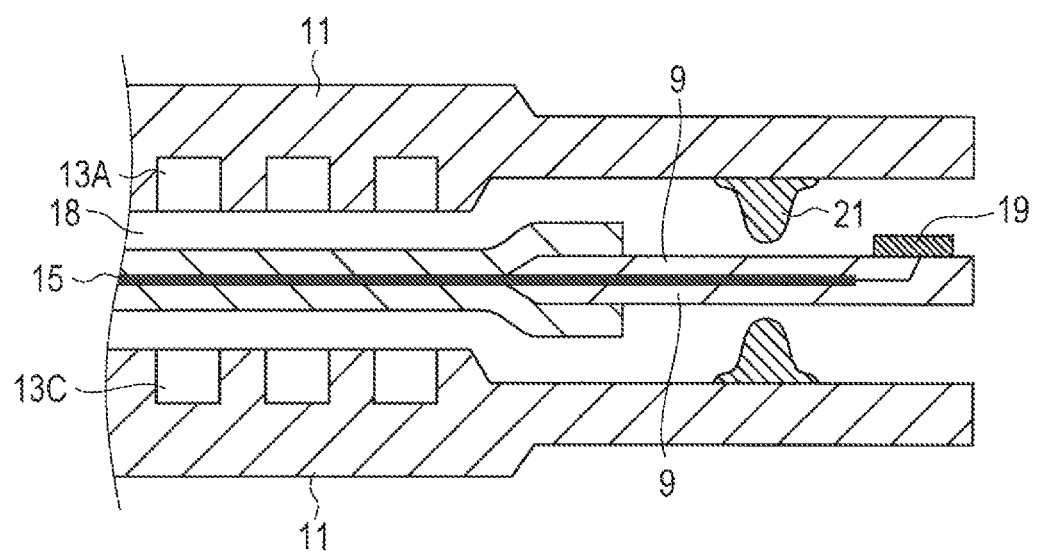
FIG. 7 illustrates an exploded state of the single cell module according to Embodiment 1, and is a partial cross-sectional diagram of a corner portion of the electrolyte membrane-electrode-frame assembly and a separator.
Figure 8:
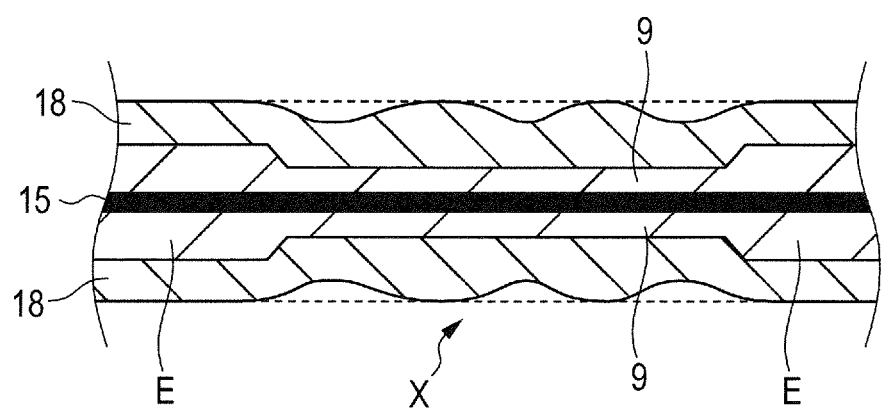
FIG. 8 is a cross-sectional diagram of the corner portion of the electrolyte membrane-electrode-frame assembly according to Embodiment 1.

FIG. 7 shows a cross-sectional diagram along a line I-I of electrolyte membrane-electrode-frame assembly 14 in FIG. 6. FIG. 8 shows a cross-section, which is taken along the line G-G (refer to FIG. 3), of the corner portion of the electrolyte membrane-electrode-frame assembly 14 of Embodiment 1.

As shown in FIG. 7, the height of corner portion X of the inner peripheral portion of frame 9 is the same as the height of the outer peripheral portion of frame 9. That is, the height of corner portion X of the inner peripheral portion of frame 9 is configured to be lower than the height of convex portion E along the linear side portion of the inner peripheral portion of frame 9. Accordingly, as shown in FIG. 8, even when gas diffusion layers (GDLs) 18 overlap each other or are twisted at corner portion X of the inner peripheral portion of frame 9, the thickness of single cell module 2 does not increases, and may be set to a predetermined thickness.

In this manner, when the thickness of corner portion X of the inner peripheral portion of frame 9 on which gas diffusion layers (GDLs) 18 ride is set to be smaller than the thickness of convex portion E of the linear side portion of the inner peripheral portion of frame 9, the thickness of single cell module 2 is set to be maintained in a predetermined thickness, even when gas diffusion layers (GDLs) 18 overlap each other or are twisted at corner portion X. As a result, a fastening load of fuel cell stack 1 may be appropriately maintained, and thus an excessive load is not applied to frame 9 or electrolyte membrane 15, and fracture of electrolyte membrane 15 and gas diffusion layers (GDLs) 18 is suppressed. As a result, durability of the single cell module may be increased.

Figure 9A:
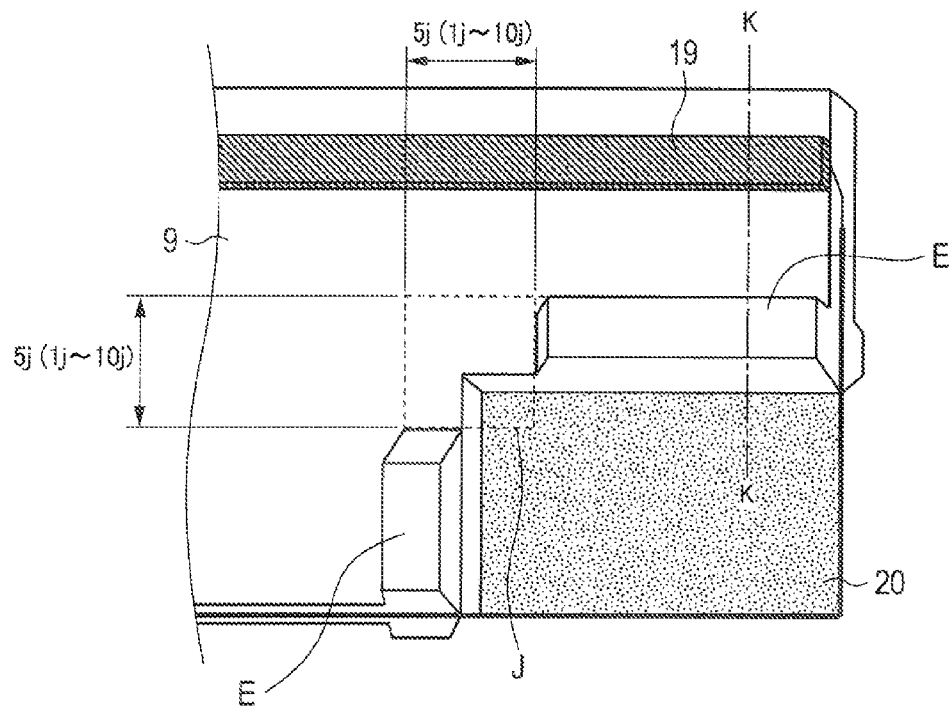
FIG. 9A is a schematic diagram of a corner portion of the frame of the electrolyte membrane-electrode-frame assembly according to Embodiment 1.
Figure 9B:
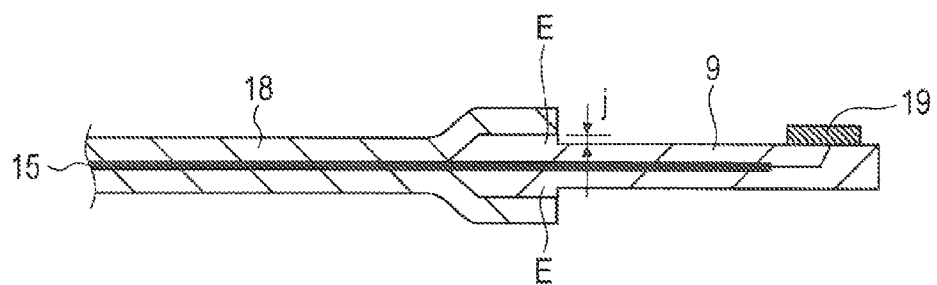
FIG. 9B is a partial cross-sectional diagram of the electrolyte membrane-electrode-frame assembly according to Embodiment 1.

A range of corner portion X of the inner peripheral portion of frame 9 will be described with reference to FIGS. 9A-9B. Similarly to FIG. 6, FIG. 9A shows a schematic diagram of frame 9 within a range surrounded by the line H of electrolyte membrane-electrode-frame assembly 14 in FIG. 3. FIG. 9B shows a cross-sectional diagram taken along a line K-K in FIG. 9A.

As shown in FIG. 9A, a corner portion of the inner peripheral portion of frame 9 is set in a square region surrounded by a dotted line J. In addition, as shown in FIG. 9B, the thickness of the convex portion along the linear portion of the inner peripheral portion of frame 9 is set to a "thickness j." It is preferable that a length of one side of the square region surrounded by the dotted line J be 1 to 10 times the "thickness j." In Embodiment 1, the length of the one side of the square region, which constitutes the corner portion and is surrounded by the dotted line J, is set to five times the "thickness j." It is preferable that a gap space between separator 11 and frame 9 be small. Therefore, it is preferable that an area of the square region, which is the corner portion of the inner peripheral portion of frame 9 and is surrounded by the dotted line J, be set to be small within a range with which the thickness of single cell module 2 at the corner portion does not increase due to overlapping of gas diffusion layers (GDLs) 18.

Embodiment 2

Figure 10A:
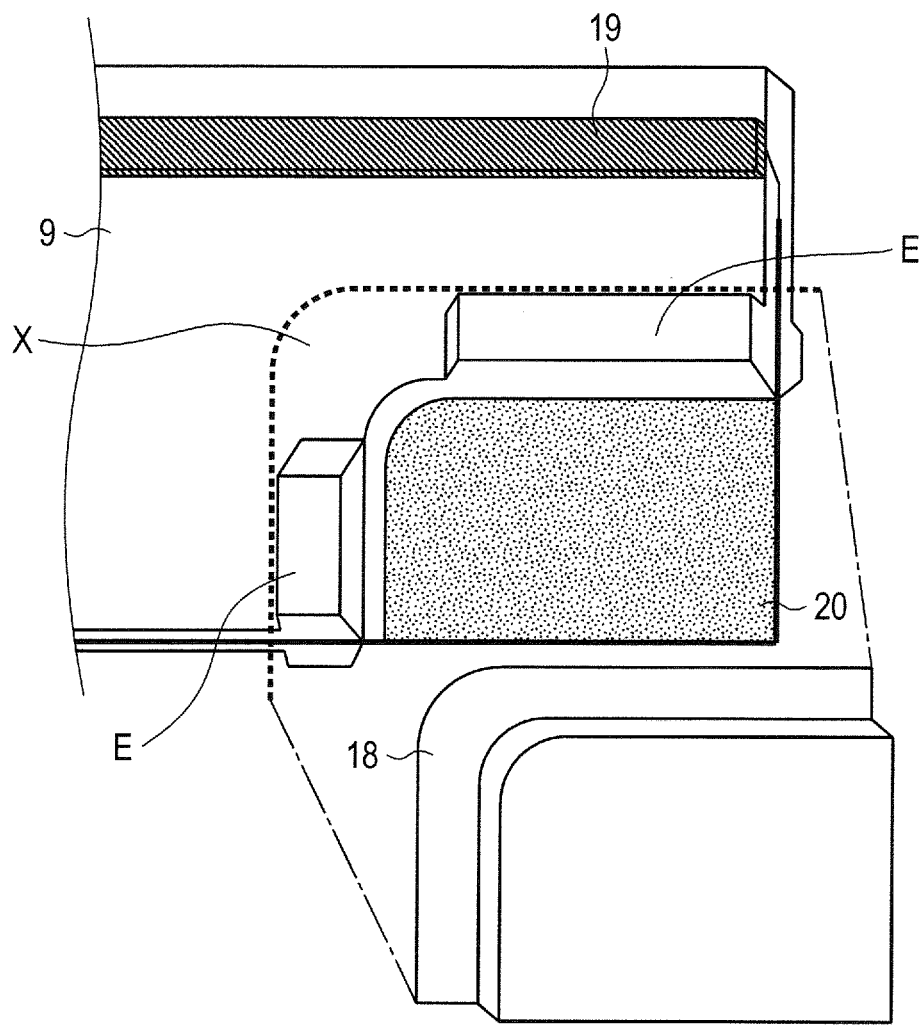
FIG. 10A is a schematic diagram partially illustrating an exploded state of an electrolyte membrane-electrode-frame assembly, and a corner portion of an inner peripheral portion of the frame and a gas diffusion layer (GDL) according to Embodiment 2.

FIG. 10A illustrates a configuration of corner portion X of an inner peripheral portion of frame 9 in electrolyte membrane-electrode-frame assembly 14 according to Embodiment 2. With the configuration of Embodiment 2, overload or deterioration of MEA 10 due to overlapping of gas diffusion layers (GDLs) 18 is suppressed.

Both an inner peripheral edge of corner portion X of the inner peripheral portion of frame 9 in electrolyte membrane-electrode-frame assembly 14 shown in FIG. 10A, and an outer edge of the corner portion of gas diffusion layers (GDLs) 18 have an arc shape. Similarly to Embodiment 1, even when gas diffusion layers (GDLs) 18 are twisted or overlap each other at corner portion X of the inner peripheral portion of frame 9, the thickness of single cell modules 2 may be maintained to a predetermined thickness. Accordingly, a fastening load of fuel cell stack 1 may be appropriately maintained, and thus an excessive load is not applied to frame 9 or electrolyte membrane 15. As a result, durability of the single cell module may be increased. Furthermore, in Embodiment 2, since the inner peripheral side of corner portion X of the inner peripheral portion of frame 9 has the are shape, resin molding of frame 9 becomes easy.

Embodiment 3

Figure 10B:
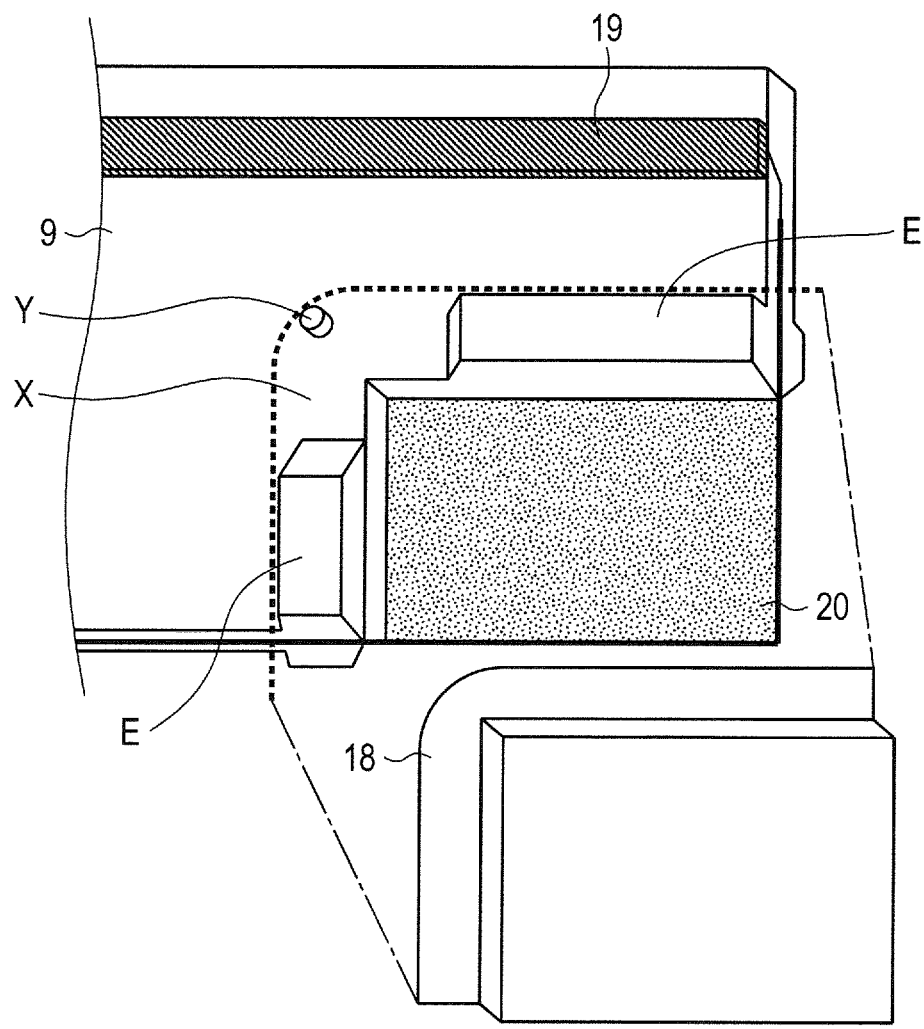
FIG. 10B is a schematic diagram partially illustrating an exploded state of an electrolyte membrane-electrode-frame assembly, and a corner portion of an inner peripheral portion of the frame and a gas diffusion layer (GDL) according to Embodiment 3.
Figure 11:
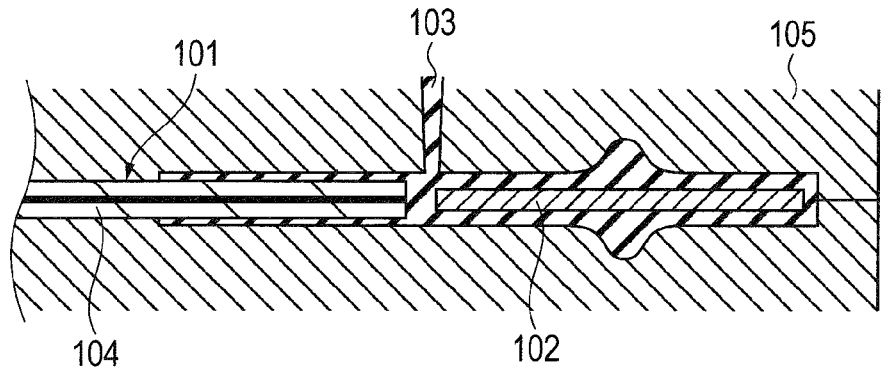
FIG. 11 is a diagram illustrating an MEA in the related art.
Figure 12:
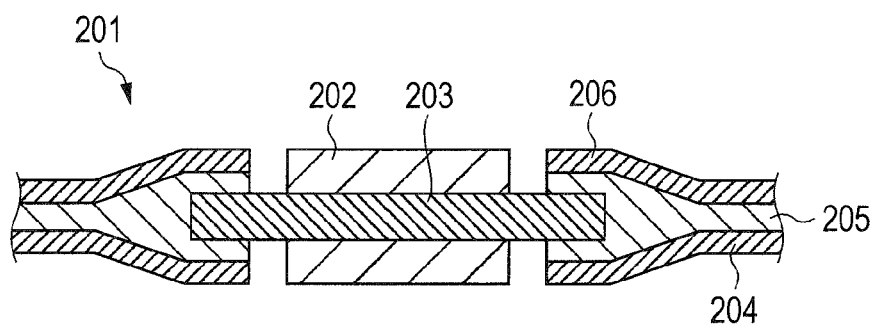
FIG. 12 is a diagram illustrating an MEA in the related art.

FIG. 10B illustrates a configuration of corner portion X of an inner peripheral portion of frame 9 in electrolyte membrane-electrode-frame assembly 14 according to Embodiment 3. With the configuration of Embodiment 3, overload due to overlapping of gas diffusion layers (GDLs) 18 or deterioration of MEA 10 is suppressed.

Protrusion Y having the same height as the convex portion of the linear side portion of the inner peripheral portion of frame 9 is provided at a part of corner portion X of the inner peripheral portion of frame 9 in electrolyte membrane-electrode-frame assembly 14 shown in FIG. 10B. Similarly to Embodiment 1, even when gas diffusion layers (GDLs) 18 are twisted or overlap each other at corner portion X of the inner peripheral portion of frame 9, the thickness of single cell modules 2 may be maintained to a predetermined thickness. Accordingly, a fastening load of fuel cell stack 1 may be appropriately maintained, and thus an excessive load is not applied to frame 9 or electrolyte membrane 15. As a result, durability of the single cell module may be increased. Furthermore, in Embodiment 3, since protrusion Y is provided at a part of corner portion X of the inner peripheral portion of frame 9, there is an advantage in that alignment of gas diffusion layers (GDLs) 18 becomes easy.

Examples

Description will be made with respect to manufacturing of the polymer electrolyte type fuel cell related to Embodiment 2 described above. First, a polymer electrolyte membrane was obtained by punching, for example, a resin material (Nafion (registered trademark) N-117, manufactured by Du Pont Kabushiki Kaisha) having a thickness of 50 micro meter using a Thomson mold.

An anode catalyst layer and a cathode catalyst layer were formed on both surfaces of the obtained polymer electrolyte membrane using an applying method, whereby a catalyst layer-attached electrolyte membrane was obtained. The anode catalyst layer and the cathode catalyst layer were formed at the central portion of the polymer electrolyte membrane instead of being formed on the entire surface thereof, and were not formed in the vicinity of an outer peripheral side.

Next, modified polyphenylene ether (modified PPE) was resin-molded to prepare two frame precursors. A peripheral portion of the catalyst-attached electrolyte membrane was interposed between the two frame precursors. As shown in FIG. 4, the bonding portion 19 made of the modified PPE was resin-molded on the bonding surface, and the two frame precursors were bonded to each other. In this manner, a catalyst layer-attached electrolyte membrane-frame assembly was obtained.

The thickness of the outer peripheral portion of the frame was set to 0.8 mm, and the height j (refer to FIG. 9B) of convex portion E of the linear side portion of the inner peripheral portion of the frame was set to 0.5 mm. The width of convex portion E was set to 2.5 mm. One side of the range (region surrounded by the dotted line J) of corner portion X was set to 3.5 mm. In addition, the inner peripheral edge of the corner portion was set to an arc shape (refer to FIG. 10A).

The gas diffusion layers were bonded to both surfaces of the catalyst layer-attached electrolyte membrane-frame assembly on an anode side and a cathode side, respectively, whereby an electrolyte membrane-electrode-frame assembly was obtained. An area of the gas diffusion layer was set to be the same as an area of the catalyst layer that was formed using the application method. According to this, as indicated by the dotted line in FIG. 10A, the gas diffusion layer (GDL) was laminated to ride on convex portion E up to an outer peripheral edge of convex portion E. In addition, the gas diffusion layer (GDL) was constituted by a diffusion layer containing carbon as a main component and having porosity of approximately 50%.

The electrolyte membrane-electrode-frame assembly that was prepared as described above was interposed between an anode side separator and a cathode side separator, whereby a single cell module was obtained. 50 single cell modules were stacked, and metallic current collector plate 3, and end plate 4 formed from an electrically insulating material and functioning also as an insulating plate were disposed at both end portions of the stacked single cell modules, respectively (refer to FIG. 1). Furthermore, these components were fixed with fastening bolt 7 and nut 8, whereby a polymer electrolyte type fuel cell was obtained.

Pressure sensitive paper was disposed on an interface between electrolyte membrane-electrode-frame assembly 14 and separator 11 in an arbitrary single cell module contained in the polymer electrolyte type fuel cell. Two kinds of pressure sensitive paper in which a pressurized portion shows a red color was used, one is a paper for super ultra-low pressure (0.2 to 0.6 MPa) and the other is paper for ultra-low pressure (0.5 to 2.5 MPa)

As a result thereof, it could be seen that a surface pressure of 90% or more of a fastening load was applied to the power generation region surrounded by the line D (refer to FIG. 3) and the gasket of the separators. On the other hand, the load applied to the gas diffusion layer (GDL) that rode on the inner peripheral portion of the frame was 10% or less of the fastening load. In addition, an excessive surface pressure was not applied to the corner portion of the inner peripheral portion of the frame.

It was confirmed that an excessive pressure was not applied to a large thickness site (convex portion E) of the inner peripheral portion of the frame or a site thereof on which the gas diffusion layer (GDL) rode, and a corner portion of the inner peripheral portion of the frame. And also, it was confirmed that the membrane or the like did not deteriorate.

INDUSTRIAL APPLICABILITY

The solid polymer electrolyte type fuel cell related to the invention may be manufactured without applying a molding pressure to an electrolyte membrane and a gas diffusion layer (GDL). Accordingly, deterioration of the electrolyte membrane and the gas diffusion layer (GDL) is suppressed. Furthermore, according to the solid polymer electrolyte type fuel cell related to the invention, deterioration of the electrolyte membrane due to an excessive fastening load may be suppressed. Therefore, the invention may improve the performance of the polymer electrolyte type fuel cell.

The solid polymer electrolyte type fuel cell related to the invention is useful as a fuel cell that is used in, for example, a portable power supply, a power supply for an electric vehicle, an in-house cogeneration system, and the like.

REFERENCE SIGNS LIST

101 MEA
102 Reinforcing frame
103 Liquid rubber
104 Gas diffusion layer (GDL)
201 Electrolyte membrane-catalyst laminated body
202 Catalyst layer
203 Electrolyte membrane
204 Reinforcing sheet
1 Fuel cell stack
2 Single cell module (cell)
3 Current collector plate
4 End plate
5 Spring
6 Bolt hole
7 Fastening bolt
8 Nut
9 Frame
10 MEA
11 Separator
11A Anode side separator
11C Cathode side separator
11W Cooling water separator
12 Manifold hole
13A Fuel gas flow channel groove
13C Oxidant gas flow channel groove
13W Cooling water flow channel groove
14 Electrolyte membrane-electrode-frame assembly
15 Polymer electrolyte membrane (electrolyte membrane)
16 Catalyst layer (anode catalyst)
17 Catalyst layer (cathode catalyst)
18 Gas diffusion layer (GDL)
19 Bonding portion of frame
20 Catalyst layer-attached electrolyte membrane-frame assembly
21 Gasket

The invention claimed is:

1. A solid polymer electrolyte type fuel cell comprising stacked single cell modules, wherein each of the single cell modules comprises:
an electrolyte membrane-electrode-frame assembly that includes a catalyst layer-attached electrolyte membrane having a polymer electrolyte membrane, an anode catalyst provided on one surface of the polymer electrolyte membrane, and a cathode catalyst provided on the other surface of the polymer electrolyte membrane, and a pair of frames that is disposed at a peripheral portion of the catalyst layer-attached electrolyte membrane to interpose the peripheral portion therebetween, includes a gas supply portion configured to supply a fuel gas and an oxidant gas to the anode catalyst and the cathode catalyst, respectively, and has a rectangular inner periphery;
a pair of separators that interposes the electrolyte membrane-electrode-frame assembly therebetween from the anode side and the cathode side; and
a pair of gas diffusion layers that is disposed between the pair of separators and the electrolyte membrane-electrode-frame assembly, and are laminated to cover an inner peripheral portion of a respective one of the pair of frames, the inner peripheral portion having four linear side portions and four corner portions and forming a loop with the four linear side portions and the four corner portions, a corner portion among the four corner portions being located between two linear side portions among the four linear side portions in the loop,
wherein a thickness of at least a part of only the corner portion is smaller than thicknesses of the two linear side portions,
the gas diffusion layers placed on the inner peripheral portion fill a space formed at the corner portion,
each of the pair of frames has a convex portion on its surface facing a respective one of the pair of separators, the convex portion being within the inner peripheral portion of the respective frame, and having a height greater than an outer peripheral portion of the respective frame, and
each of the pair of gas diffusion layers is disposed to ride on the convex portion of a respective one of the pair of frames.

2. The solid polymer electrolyte type fuel cell according to claim 1, wherein an inner periphery of the corner portion has an arc shape.

3. The solid polymer electrolyte type fuel cell according to claim 1,
 each of the pair of gas diffusion layers is disposed to completely cover a top surface of the convex portion of the respective one of the pair of frames.

4. An electrolyte membrane-electrode-frame assembly, comprising:
 a catalyst layer-attached electrolyte membrane including a polymer electrolyte membrane, an anode catalyst provided on one surface of the polymer electrolyte membrane, and a cathode catalyst provided on the other surface of the polymer electrolyte membrane; and
 a pair of frames that is disposed at a peripheral portion of the catalyst layer-attached electrolyte membrane to interpose the peripheral portion therebetween, includes a gas supply portion configured to supply a fuel gas and an oxidant gas to the anode catalyst and the cathode catalyst, respectively, and has a rectangular inner periphery,
 wherein each of the pair of frames has an inner peripheral portion having four linear side portions and four corner portions and forming a loop with the four linear side portions and the four corner portions, a corner portion among the four corner portions being located between two linear side portions among the four linear side portions in the loop, a thickness of at least a part of only the corner portion is smaller than thicknesses of the two linear side portions,
 a pair of gas diffusion layers placed on the inner peripheral portion fill spaces formed at the four corner portions,
 each of the pair of frames has a convex portion on a surface opposite to a surface facing the other one of the pair of frames,
 the convex portion being within the inner peripheral portion of the respective frame, and having a height greater than an outer peripheral portion of the respective frame, and
 each of the pair of gas diffusion layers is disposed to ride on the convex portion of a respective one of the pair of frames.

5. The electrolyte membrane-electrode-frame assembly according to claim 4,
 wherein an inner periphery of the corner portion has an arc shape.

6. The electrolyte membrane-electrode-frame assembly according to claim 4,
 wherein the gas diffusion layer is laminated to cover the inner peripheral portion of the frame.

7. The electrolyte membrane-electrode-frame assembly according to claim 4,
 each of the pair of gas diffusion layers is disposed to completely cover a top surface of the convex portion of the respective one of the pair of frames.

* * * * *